June 27, 1950     D. A. LEWALLEN     2,513,031
DRILL STEM TEST CHECK
Filed Nov. 21, 1947     2 Sheets-Sheet 2
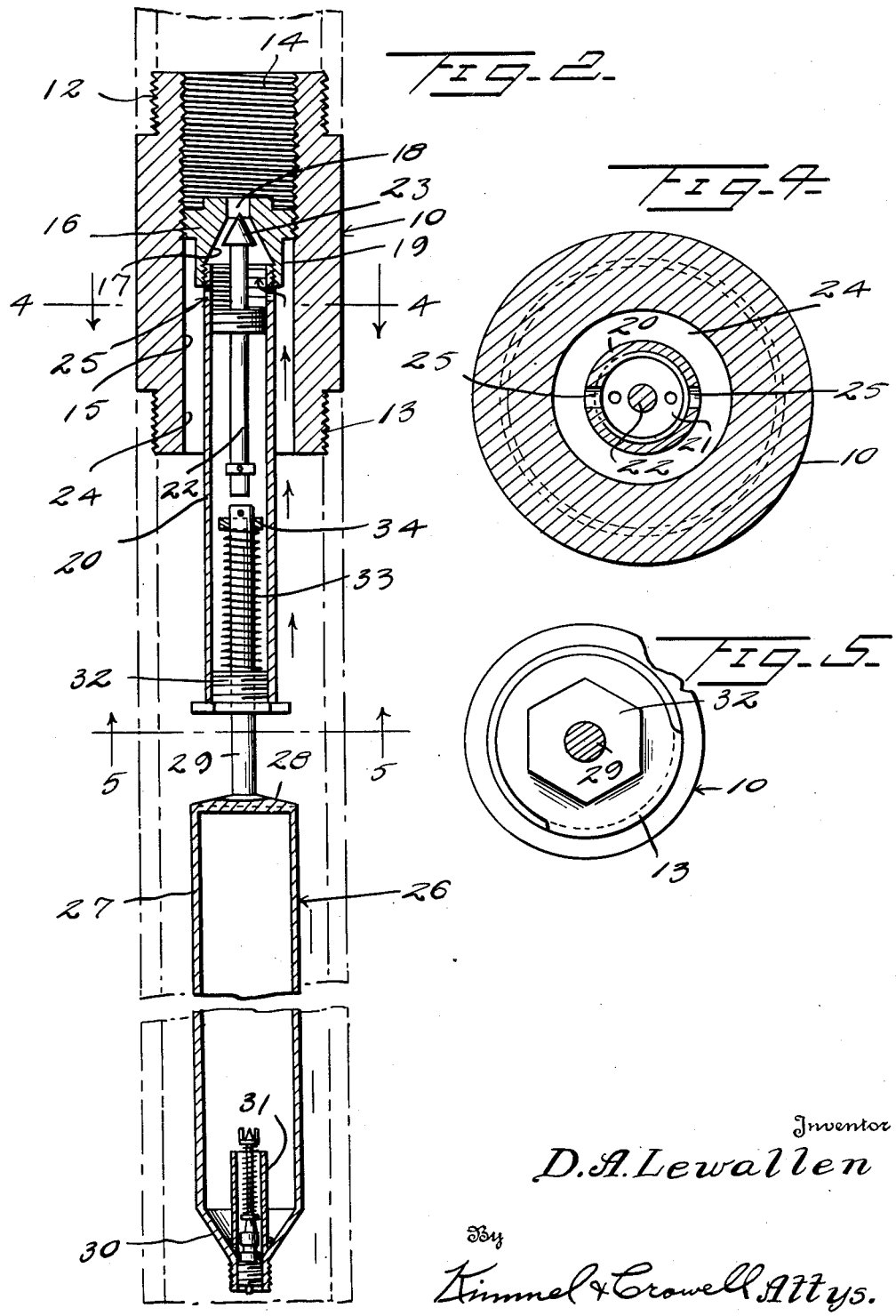
Inventor
D. A. Lewallen
By Kimmel & Crowell Attys.

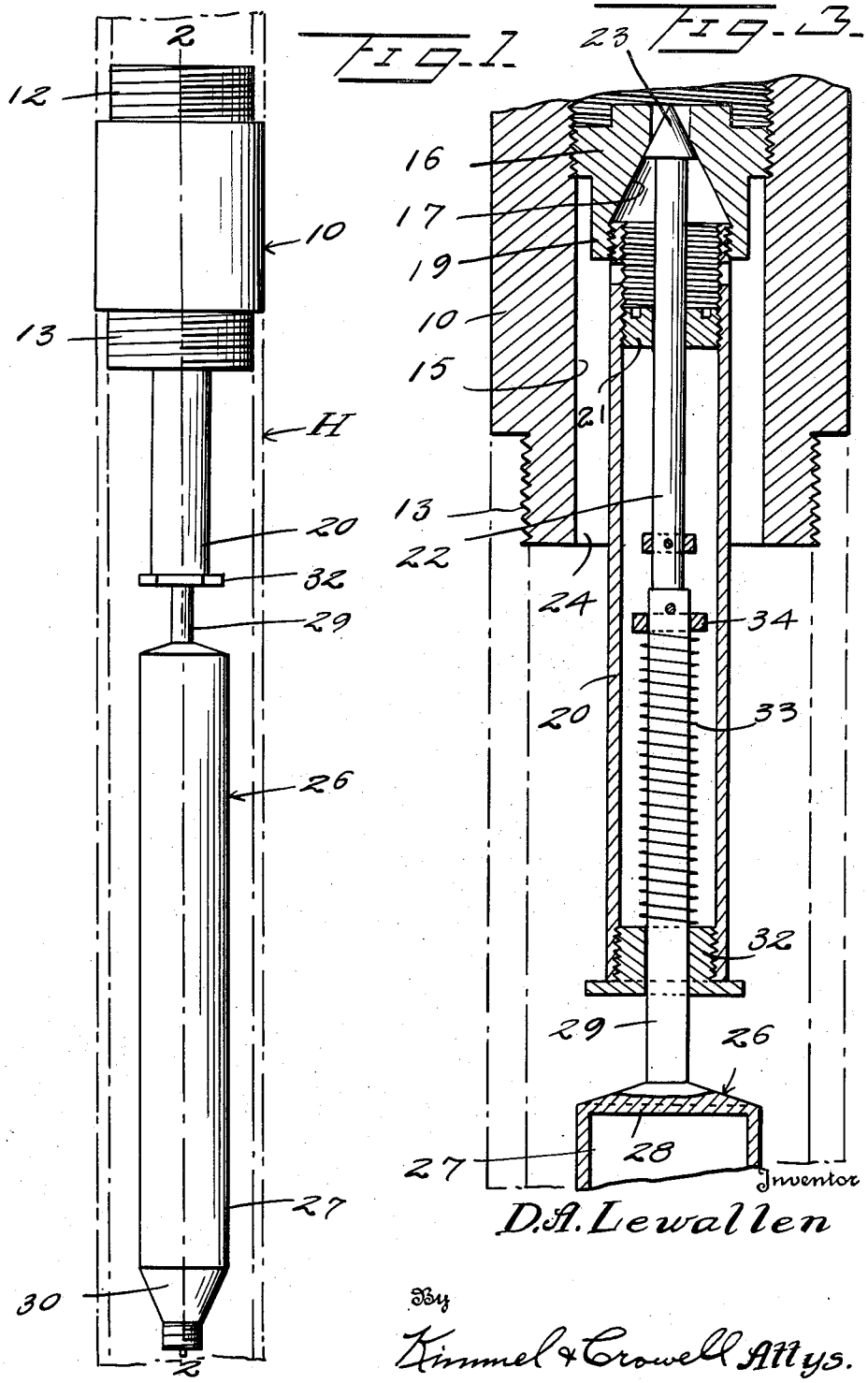

Patented June 27, 1950

2,513,031

UNITED STATES PATENT OFFICE 2,513,031

DRILL STEM TEST CHECK

Daniel A. Lewallen, Carmi, Ill.

Application November 21, 1947, Serial No. 787,275

2 Claims. (Cl. 137—104)

This invention relates to a fluid check for attachment to a drill stem test pipe.

In the drilling of oil wells a test pipe is inserted into the well for the purpose of ascertaining the location of oil or other fluids, and during such test it frequently happens that the liquids overflow onto the surface of the ground with resultant injury to or damage to adjacent property, equipment and workers. It is, therefore, an object of this invention to provide a liquid check for interposing in the length of the spring of pipe forming the test which is so constructed as to block off the flow of liquid and thereby prevent waste of the oil, and damage or injury to property or workers, and in addition eliminate fire hazards resulting from spreading of the oil on the surface about the well.

Another object of this invention is to provide a check valve construction of this kind which will be inoperative under gas pressure, but will be operative in the presence of liquid to stop the upward flow of the liquid so that the liquid will not spill out onto the ground.

A further object of this invention is to provide a check valve construction of this kind which can be mounted at any selected point in the length of the pipe string.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detailed side elevation of a fluid check constructed according to an embodiment of this invention and adapted to be interposed in the length of a drill stem test string.

Figure 2 is a sectional view taken substantially on the line 2—2 of Figure 1.

Figure 3 is a fragmentary vertical section of the upper portion of the check showing the latter in closed position.

Figure 4 is a sectional view taken on the line 4—4 of Figure 2.

Figure 5 is a sectional view taken on the line 5—5 of Figure 2.

Referring to the drawings, the numeral 10 designates a tubular body adapted to be interposed in the length of a drill stem test string, indicated generally as at H. The body 10 is provided at its upper end with a threaded nipple 12 and also provided at its lower end with a threaded nipple 13. The body 10 is formed with a bore extending therethrough which is partially threaded as indicated at 14 and is partially of smooth formation as indicated at 15. A valve seat member 16 is threaded into the upper end of the body 10 being formed with a tapered or substantially conical valve seat 17 and a central opening 18.

The valve seat member 16 also includes a depending sleeve 19 formed with interior threads which are engaged by a tubular member 20 extending downwardly through the smooth bore 15 and terminating at a point below the body 10. The tubular member or guide 20 has threaded thereinto a guide nut 21 through which the stem 22 of a valve plug 23 is adapted to slidably engage. The valve plug 23 is adapted to gravitatingly move downwardly to open position so that gas rising in the space 24 between the sleeve 20 and the surface of the bore 15 may flow through openings 25 in the sleeve 20 and then flow past the valve plug 23 and the central opening 18 into the pipe above the body 10.

In order to provide for moving of the valve plug 23 to closed position when the drill stem test string strikes oil, water or other liquid, I have provided a buoyant body 26 which extends below the sleeve 20. The buoyant body 26 is constructed in the form of a cylinder 27 having a top wall 28 from which a slide rod 29 extends. The cylinder 20 is formed with a tapered bottom 30 through which a spring-pressed air valve 31 extends so that the interior of the buoyant member 26 may be filled with compressed air for floating this cylinder on liquid which may engage between the cylinder 26 and the wall of the drill stem test pipe. The slide rod 29 slidably engages through a guide nut 32 which is threaded onto the lower end of the tube 20 and a spring 33 engages about the rod 29, bearing at its lower end against the nut 32 and at its upper end against a collar 34 which is fixed to the upper end portion of the rod 29. The spring 33 provides a counterbalancing means for the weight of the buoyant member 26. The upper end of the rod 29 is disposed in confronting relation with respect to the stem 22 so that when the buoyant member 26 floats on liquid, the rod 29 will be moved upwardly and engage stem 22 so as to move valve plug 23 to closed position.

In the use and operation of this device the body 10 is interposed in the length of string of pipe forming a drill stem test member and is then inserted into the well casing. In the event that during the downward movement of the test string gas should be found, this gas will flow upwardly through the string, past the buoyant member 26 and then through the space 24, the openings 25 and past the normally open valve plug 23. In the event liquid should enter the test string, the liquid will float the buoyant member 26 and this member will move upwardly and push valve stem 22 upwardly so as to seat valve plug 23 on seat 17. At this time the interior of the test string is closed against upward flow of both gas and liquid so that the liquid will not be able to overflow the upper end of the string and cause damage or injury to the property and workers about the well casing. With a liquid check as hereinbefore described, the hazards which have heretofore been present about an oil well during the drilling of the well and the testing thereof will be substantially entirely eliminated and if any liquid under pressure is struck by the test string, and the upward flow of the liquid checked by means of the check valve construction hereinbefore described, the casing or test string may be appropriately sealed off so as to prevent the overflow of the casing and the test string.

I claim:

1. A liquid check for interposing in a drill stem test pipe comprising a body formed with a bore therethrough and provided with means at each end thereof for coupling said body to said test pipe, a valve seat carried by said body, a valve plug engageable on said seat from below, a guide depending from said seat, a valve stem fixed to said plug and slidable in said guide, a buoyant member, means dependingly supporting said buoyant member from said guide, said latter named means including an element disposed in alignment with said stem whereby rising of said buoyant member will effect upward movement of said plug to closed position, and a counterbalancing spring interposed between said guide and said buoyant member and adapted to urge said element upwardly against the weight of said buoyant member.

2. A liquid check for interposing in a drill stem test pipe comprising a body formed with a bore therethrough and provided with coupling means at each end thereof, a valve seat carried by said body, a tubular member depending from said seat and formed with at least one opening adjacent said seat, a valve plug engageable on said seat from below, a stem depending from said plug, a guide in said tubular member for said stem, a buoyant member below said tubular member, a second guide carried by said tubular member, a rod fixed to said buoyant member engaging said second guide and adapted upon upward movement of said buoyant member to engage said stem for moving said plug upwardly to closed position, a collar fixed on said rod, and a counterbalancing spring about said rod between said collar and said second guide.

DANIEL A. LEWALLEN.

REFERENCES CITED

The following references are of record in the file of this patent:

UNITED STATES PATENTS

| Number | Name | Date |
|---|---|---|
| 1,119,979 | Mulligan | Dec. 8, 1914 |
| 1,517,459 | Reiter | Dec. 2, 1924 |
| 1,920,062 | Casini | July 25, 1933 |
| 1,963,867 | Robisch | June 19, 1934 |
| 2,122,080 | Wisdom | June 28, 1938 |